United States Patent
Nowicki et al.

(10) Patent No.: US 9,882,857 B2
(45) Date of Patent: Jan. 30, 2018

(54) GROUP MESSAGING SYSTEM

(71) Applicant: VODAFONE IP LICENSING LIMITED, Newbury, Berkshire (GB)

(72) Inventors: Jakub Nowicki, London (GB); Phillip Carter, London (GB); Oscar Gallego Gomez, London (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 191 days.

(21) Appl. No.: 15/004,707

(22) Filed: Jan. 22, 2016

(65) Prior Publication Data

US 2016/0248714 A1 Aug. 25, 2016

(30) Foreign Application Priority Data

Feb. 19, 2015 (GB) .................................. 1502815.2

(51) Int. Cl.
*G06F 15/16* (2006.01)
*H04L 12/58* (2006.01)
(Continued)

(52) U.S. Cl.
CPC .......... *H04L 51/24* (2013.01); *H04L 12/1425* (2013.01); *H04L 12/1446* (2013.01);
(Continued)

(58) Field of Classification Search
CPC .......... H04L 51/00; H04L 51/10–51/18; H04L 51/38; G06Q 20/00; G06Q 20/08;
(Continued)

(56) References Cited

U.S. PATENT DOCUMENTS

| | | | | |
|---|---|---|---|---|
| 5,923,733 | A * | 7/1999 | Binns | .................... H04M 3/533 379/69 |
| 7,386,520 | B2 * | 6/2008 | Hehl | .................... G06Q 10/107 379/100.08 |

(Continued)

FOREIGN PATENT DOCUMENTS

| | | |
|---|---|---|
| EP | 1310085 A1 | 5/2003 |
| EP | 1821452 A1 | 8/2007 |
| KR | 20110079235 A | 7/2011 |

OTHER PUBLICATIONS

Search Report issued in EP Application No. 16153806 dated Jul. 6, 2016.
GB Search Report for GB1502815.2 dated Jul. 30, 2015.

*Primary Examiner* — Brendan Higa
(74) *Attorney, Agent, or Firm* — Workman Nydegger (57) ABSTRACT

A data processing method performed in a group messaging server of a mobile telecommunications network, the method comprising the steps of receiving an incoming message at the group messaging server from a remote user terminal, the message being for distribution to a group of users; storing details of the incoming message in a messaging log, the details comprising a message identifier received with the incoming message; identifying at least one recipient from the group of users to which the incoming message should be transmitted; transmitting an outgoing message to each of the at least one recipient, wherein the outgoing message comprises at least part of the incoming message and the message identifier; storing details of each outgoing message in the message log, the details comprising the message identifier; and processing the message log to identify groups of messages, wherein the groups of messages are identified by having a common message identifier, and generating charging data based on the groups of messages.

5 Claims, 6 Drawing Sheets

(51) Int. Cl.
   *H04L 12/14* (2006.01)
   *H04M 15/00* (2006.01)
   *H04W 4/24* (2009.01)
   *H04W 4/06* (2009.01)
   *H04W 4/12* (2009.01)

(52) U.S. Cl.
   CPC ........... *H04M 15/41* (2013.01); *H04M 15/53* (2013.01); *H04M 15/57* (2013.01); *H04M 15/62* (2013.01); *H04M 15/765* (2013.01); *H04W 4/06* (2013.01); *H04W 4/12* (2013.01); *H04W 4/24* (2013.01); *H04L 51/38* (2013.01); *H04M 2215/01* (2013.01)

(58) Field of Classification Search
   CPC ..... G06Q 20/102; H04M 15/31–15/43; H04M 2215/01; H04M 2215/0108; H04M 2215/0148; H04M 2215/0184; H04M 2215/0152; H04W 4/12; H04W 4/24
   See application file for complete search history.

(56) References Cited

U.S. PATENT DOCUMENTS

| | | | |
|---|---|---|---|
| 2008/0125081 A1* | 5/2008 | Aaltonen | H04W 12/08 455/405 |
| 2013/0173730 A1 | 7/2013 | Hundscheidt et al. | |

* cited by examiner

GROUP MESSAGING SYSTEM

CROSS REFERENCE TO RELATED APPLICATIONS

This application claims priority to United Kingdom Application Number 1502815.2, filed on Feb. 19, 2015, the entirety of which is incorporated herein by reference.

FIELD OF THE INVENTION

This invention relates to a system and method for group messaging, and in particular to a processing method and system for billing data.

BACKGROUND

Multi-party messaging is a service offered by mobile telecommunications systems. Such systems may be known as "group chat" or "group messaging" systems and are analogous to audio or video conferencing systems, but utilise text or multimedia messages rather than live audio or video.

In a multi-party messaging system groups are defined. Each user in a group can send a message to a central destination and that message is distributed to all members of the group. Such an approach is convenient for users as they do not have to ensure all recipients are in the address list for a message as is the case when using "reply all" functionality to maintain a group conversation. Multi-party messaging systems may be provided using SMS or MMS messaging systems, or any other messaging system which allows the exchange of messages. Multi-party messaging system may also allow files to be shared amongst the group.

A computing system, which may be known as a group messaging server, may be provided by a mobile network provider to provide functions to set up and manage members of groups, and to distribute messages to members of the groups. Such a system may be provided as part of the telecommunications system or as a separate system connected to the telecommunications system.

Multi-party messaging systems can be used by users of a diverse range of mobile networks and not all members of a group chat may be users of the mobile network which is providing the group messaging server. Conventional billing arrangements between mobile network operators are that the network terminating a message charges the network originating the message on a per-message basis. These are typically known as interconnect charges. Group messaging systems can involve the transmission of large numbers of messages because each message sent by a user to a group results in that message being duplicated to many recipients. A large amount of data is thus generated to ensure messaging is correctly charged, which data must also be transmitted between networks to reconcile services provided between the two networks.

Figure 1:
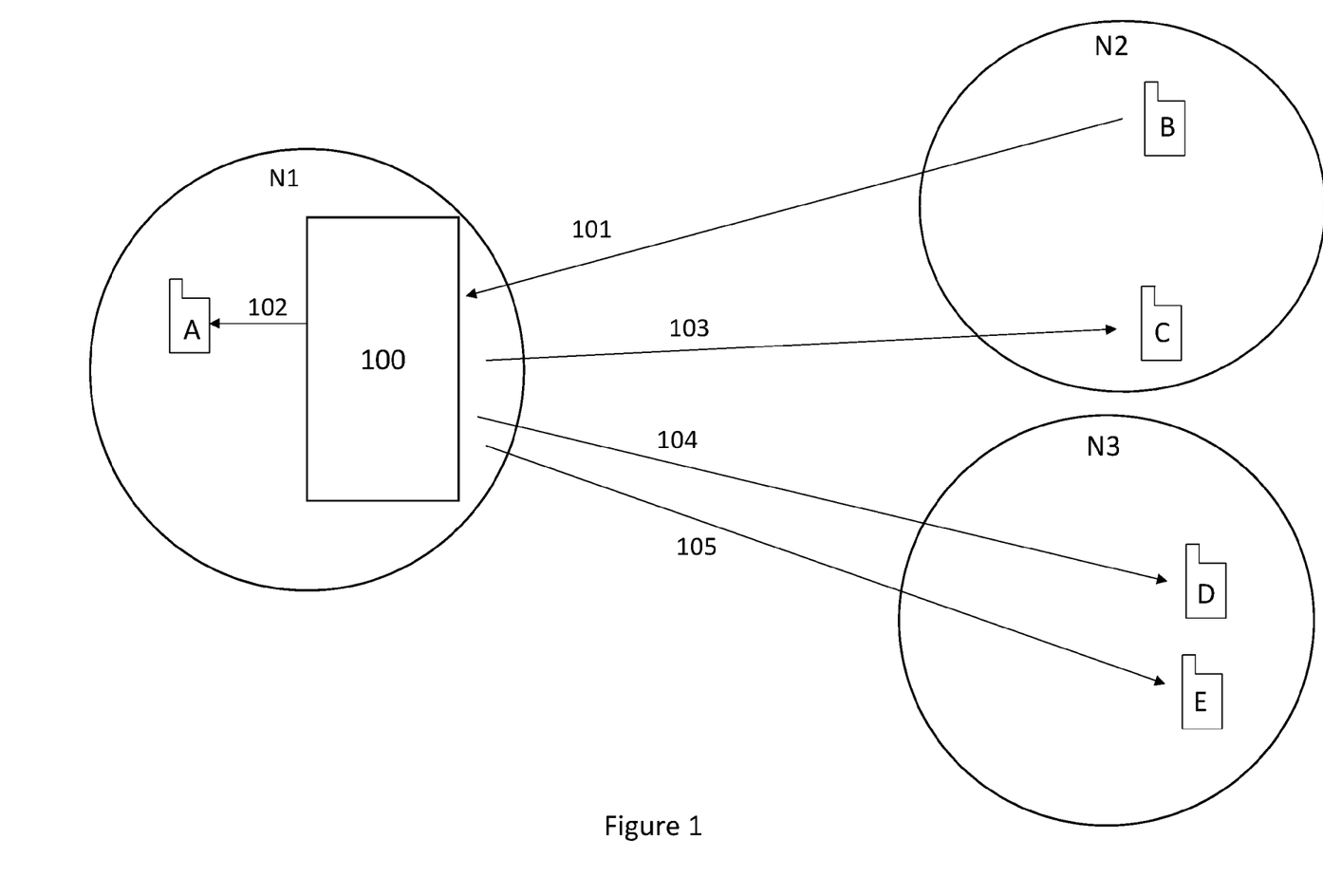
FIG. 1 shows an embodiment of a schematic diagram of a group messaging system.

FIG. 1 shows a schematic diagram of three mobile telecommunications networks, N1, N2, N3. Mobile network N1 is providing a group messaging server 100 which is hosting a group chat involving user A in network N1, users B & C in network N2, and users D & E in network N3. User B may send a first message 101 to the group messaging server 100. The group messaging server then transmits this message to each of the users A, C, D, and E in the group chat as shown by messages 102-105. Messages 101, and 103-105 are transmitted between different mobile networks and are known as interconnect messages.

A complex situation now exists for billing data which requires the storage and processing of large amounts of data even with regard to this simple example. Network N1 must store information representing (1) one incoming and one outgoing message with network N2, (2) two outgoing messages to network N3, and (3) one internal message within network N1. One message to a small, simple, group has thus resulted in the need to store at least 5 sets of data representing messages in two directions between three different networks, and to transmit and receive such data between those networks to facilitate payment reconciliation. This data is generated for every message sent in every group chat. Since there may be large numbers of messages sent in each group chat, and a large number of users within each group, the amount of data transmitted between networks to manage this can be very large.

Such per-message charging systems also gives the potential for fraud. If user B of network N2 invites a large number of contacts from network N2 to join the group, each message sent by user B to the group may result in a payment from network N1 to network N2 for terminating the forwarded messages sent from the group messaging server 100 in network N1 to the users in network N2, compared to only a single message from network N2 to N1. A user of network N2 can thus affect the payments due by network N1 to network N2.

There is thus a need for a system to reduce data storage and transmission, and avoid fraudulent activity.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a data processing method performed in a group messaging server of a mobile telecommunications network, the method comprising the steps of receiving an incoming message at the group messaging server from a remote user terminal, the message being for distribution to a group of users; storing details of the incoming message in a messaging log, the details comprising a message identifier received with the incoming message; identifying at least one recipient from the group of users to which the incoming message should be transmitted; transmitting an outgoing message to each of the at least one recipient, wherein the outgoing message comprises at least part of the incoming message and the message identifier; storing details of each outgoing message in the message log, the details comprising the message identifier; and processing the message log to identify groups of messages, wherein the groups of messages are identified by having a common message identifier, and generating charging data based on the groups of messages.

The group of users may be identified by data stored in the group messaging server.

At least one user of the group of users may be a user of a different mobile telecommunications network to the mobile telecommunications network in which the group messaging server is located.

The charging data may be dependent on the balance of incoming and outgoing messages between the mobile telecommunications network in which the group messaging server is located and another mobile telecommunications network.

There is also provided a group messaging server in communication with a mobile telecommunications network, the group messaging server comprising a computer processor configured to execute instructions to perform the method described hereinbefore.

The preferred features may be combined as appropriate, as would be apparent to a skilled person, and may be combined with any of the aspects of the invention.

DESCRIPTION OF THE DRAWINGS

The invention will now be described in detail with reference to the following drawings of which.

Throughout the drawings, like reference symbols refer to like features or steps.

DETAILED DESCRIPTION

Mobile Network operators, and mobile devices, generate and hold large amounts of data that may be useful to third parties to provide services to consumers. FIG. 1 shows a schematic diagram of a system to facilitate the use of that data in a manner that avoids the difficulties identified above.

Figure 2:
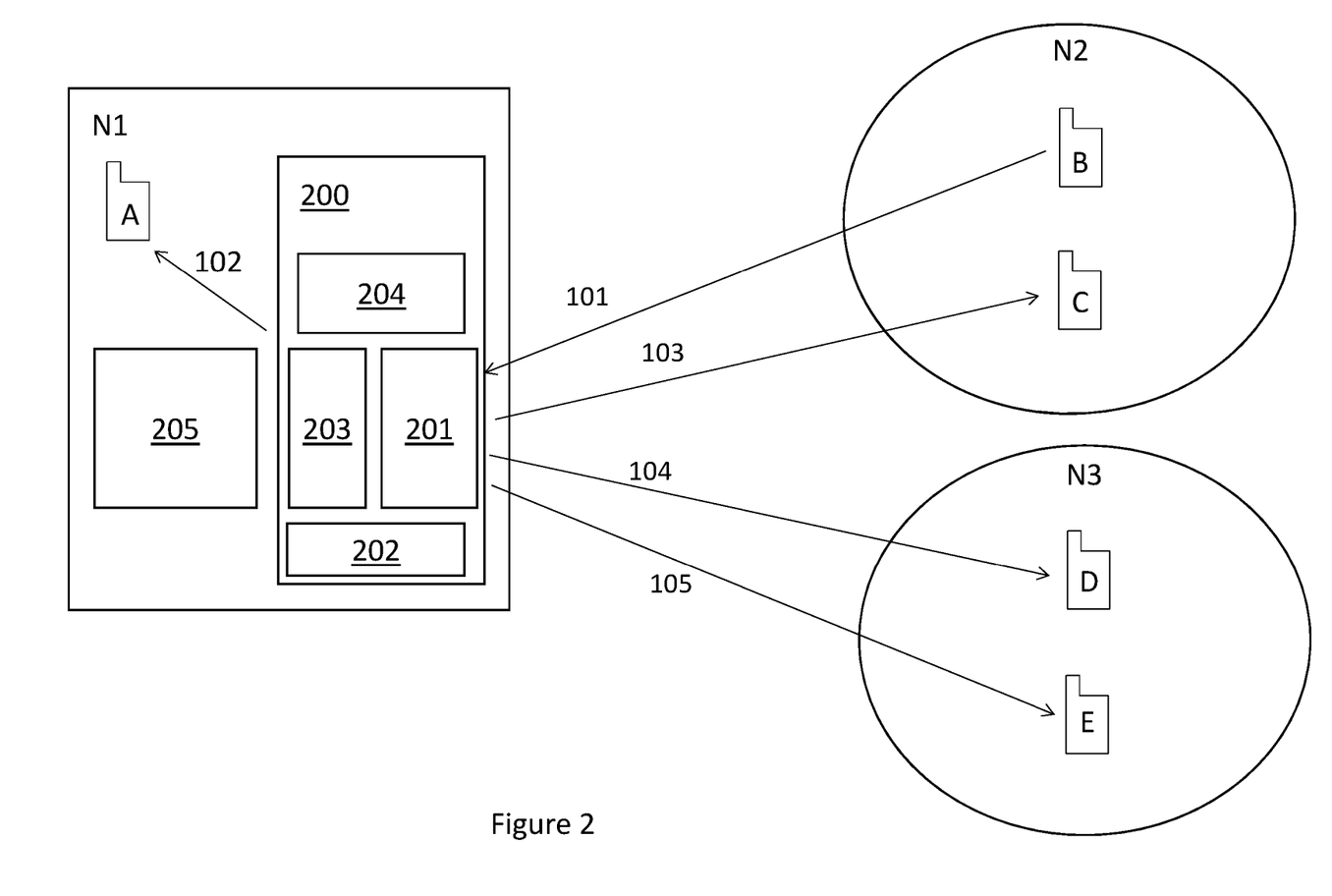
FIGS. 2 shows an embodiment of a schematic diagram of a group messaging system.

FIG. 2 shows a schematic network diagram of a group messaging system which facilitates the management of group chat sessions and manages data in an efficient manner.

Mobile network N1 comprises a group messaging server 200 which comprises a group routing system 201 and a group messaging addressing system 202. Routing system 201 is connected to the telecommunication system of mobile network N1 such that messages sent to the group messaging server 200 are directed to that routing system. Under control of addressing system 202 the routing system 201 duplicates received messages to all other users in the relevant group. Addressing system 202 may thus store data defining groups and their members, and in particular addressing details of the members to allow messages to be routed to them. Group messaging server 200 may also be provided with a management system 203 to perform the creation and amendment of groups. Management system 203 may be accessed by users via a mobile network connection, or via another computer connection such as the internet. Control of groups may be conducted using a web-interface, or control messages exchanged between a user's handset and the management system 203.

Group messaging server 200 also comprises a group messaging log 204 in communication with group routing system 201. Group messaging log 204 is utilised to store details of messages received and sent by group messaging server 200 and may be utilised for billing or other purposes. Group routing system 201 comprises functionality for storing relevant data into the group messaging log either at the time of routing messages or after the event.

Mobile network N1 also comprises a charging system 205 which is in communication with group messaging log 204. Charging system 205 receives data, or can retrieve data, from the group messaging log 204 for use in the invoicing process for both subscribers to the network N1 and for interconnect billing to networks N2 and N3.

FIG. 2 shows the same messages as shown in FIG. 1, with a user B transmitting a message 101 to a group messaging server 200, which message is transmitted to users A, C, D, and E by group routing system 201. These messages will be used in an example to describe the operation of certain functions of group chart server 200.

Figure 3:
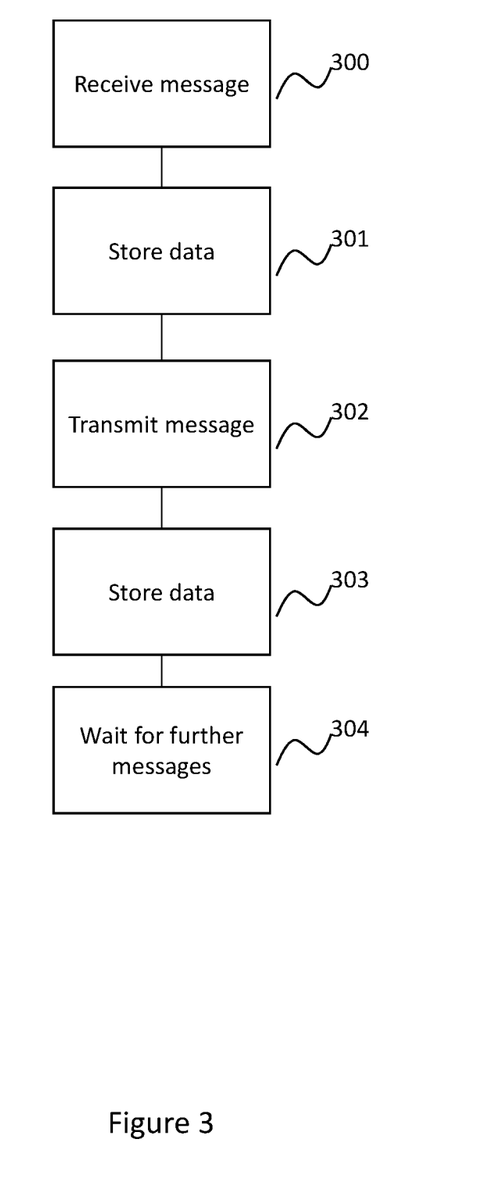
FIG. 3 shows a flow chart of managing data relating to a group messaging session.

FIG. 3 shows a flow-chart of a method of data recordal in relation to a group messaging service. At step 300 message 101 is received by group routing system 201 and identified as relating to a specific group managed by group messaging server 200. This identification may be made from the destination address specified in the message, or other identity information in the message. At step 301 data relating to the message 101 is transmitted to the messaging log 204 and stored in that log.

For example, the data shown in table 1 may be stored.

TABLE 1

| Message # | Message ID | Source network | Destination network | Sent to group messaging server |
|---|---|---|---|---|
| 1 | ID1 | N2 | N1 | Yes |

Message ID is an identifier applied to the message by the device of user B which transmitted the message. The remaining fields identify other features of the message, such as source and destination of the message.

At step 302 group routing system 201 identifies the members of the group and their addresses from group addressing system 202. At step 302 the group routing system 201 forwards the message 101 to each of the other members A, C, D, and E of the group as messages 102-105. The forwarded messages include the same message ID as the received message 101. At step 303 the details of the messages 102-105 are transferred to the messaging log 204 and stored as shown in Table 2

TABLE 2

| Message | Message ID | Source network | Destination network | Sent to group messaging server |
|---|---|---|---|---|
| 1 | ID1 | N2 | N1 | Yes |
| 2 | ID1 | N1 | N2 | No |
| 3 | ID1 | N1 | N1 | No |
| 4 | ID1 | N1 | N3 | No |
| 5 | ID1 | N1 | N3 | No |

As noted each of the messages is transmitted with the same message ID and that message ID is stored such that it is indicated that all of the messages are related to original message 101.

At step 304 the group messaging server 100 waits for further messages and continues to receive, forward, and record such messages as they are received.

Figure 4:
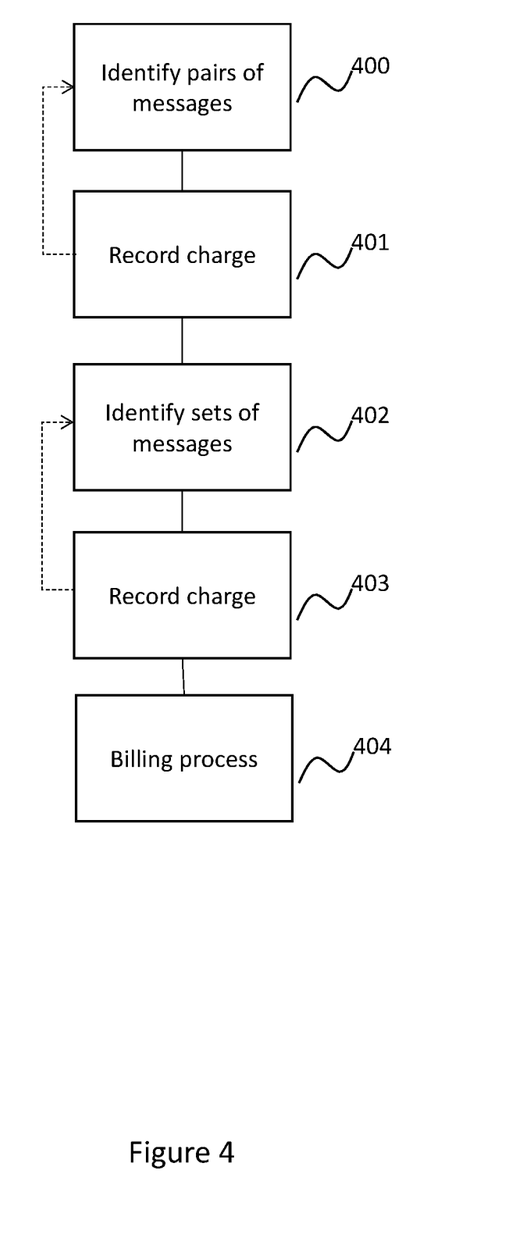
FIG. 4 shows a flow of chart of a billing process.

FIG. 4 shows a flow chart of a process of co-ordinating interconnect invoicing for a group messaging system. The charging process utilises the common message IDs applied to messages to group them to minimise data transmission and storage during the billing process. A billing process is utilised such that all related messages within a group chap (for example a received message and all forwarded replies) to a particular network are charged a single interconnect fee. This process may also have an advantage in reduced fraud as it reduces the fees generated for networks terminating messages sent by a group messaging server.

At step 400 charging system 205 interrogates group messaging log 204 to identify pairs of messages with the same message ID sent in opposite directions between two networks. In the above example messages 1 and 2 form such a pair, being between networks N1 and N2. At step 401 charging system 205 records a single interconnect charge entry for the pair of messages as the messages are related. The process of steps 400 and 401 may repeat to identify all other applicable messages, or the process may move directly to step 402 and return later to identify other applicable messages. A record may also be kept of the outgoing message to act as a "shadow" invoice to reconcile against an invoice received from network N2 for terminating that message, or the entry in the message log could be used to minimise the data stored and transferred during the charging process.

At step 402 charging system 205 interrogates group messaging log 204 to identify sets of messages having the same message ID and being from a particular first to a particular second network. In the above example messages 4 and 5 would be identified as being from network N1 to network N3 and having message ID ID1. At step 403 charging system 205 records a single interconnect entry for the two messages as they are related. The process of steps 402 and 403 may repeat immediately to review all potential networks, or the whole process of steps 400-403 may be repeated as a single process.

Message 3 in the above example is not processed in the interconnect billing process because the source and destination networks are both the network hosting the group messaging server and therefore there are no interconnect charges.

At step 404 the billing process continues by the transmission of invoices between mobile network providers and the reconciliation of those invoices and making of payments. Once entries in the messaging log have been processed they may be marked as such so that they are not considered again, or they could be deleted or archived to minimise the size of the messaging log database.

The process described with reference to FIG. 4 reduces data storage and processing during the billing process. In previous systems, in which each message is billed individually, four interconnect chargeable items would have been generated. In this example only two interconnect chargeable items have been generated, resulting in a 50% reduction in the number of entries transmitted to and stored in charging system 205. A further reduction in data processing and transmission occurs during the invoicing and reconciliation process as the number of charging entries that must be processed is reduced. Since this process involves reconciliation of charging lists from different networks the reduction in required processing may be greater than a linear reduction as the complexity of comparing long lists does not scale linearly with list length.

Further reductions in data processing and transmission may be possible by more advanced use of the stored message ID field and other fields. For example, the charging process may identify messages 1 and 2 as being to and from the same networks and thus recognise that the interconnect charges for the two messages cancel each other out or that only one of them prevails in the charging records. The charging system would thus make no entry for these entries and there would then be only a single interconnect charging entry for all five messages of the example.

The fields shown above are given by way of example only and different or other fields may be stored as well as or instead of the example fields. For example, data relating to the number of participants in a group chat, the number of distinct networks involved, or the countries of the participants may be stored.

The processes described hereinbefore may be modified to provide further features and options to improve data processing relating to charging processes.

The charging process can apply differential charging to interconnect items based on their source or destination. For example, a premium may be charged for terminating messages at a group messaging server in view of the extra resources required to process and distribute that message. The charge for out-going messages from a group messaging server may then be lower, or even zero, in recognition of the premium on the incoming message. The premium may be dependent on the number of members of the particular group chat. The premium may also be dependent on the number of different networks to which outgoing messages must be sent. For example, the greater the number of networks the higher the premium. Other parameters may also be used to differentiate pricing, for example the number of countries covered by members of a group chat, or the number of networks to which the group messaging server could send messages.

Each of the variations to charging models may be implemented by recording appropriate data in the group messaging log (or other appropriate data store) and utilising that data during the charging process.

In the above description the processes for storing details of messages and charging have been described as separate processes. However, these may be combined into a single process in which the data for the group messaging messages is analysed as it is generated, or immediately thereafter, and the charging entries generated and stored directed. Such a method avoids the need to store data in the message log thereby further reducing data handling requirements.

Figure 5:
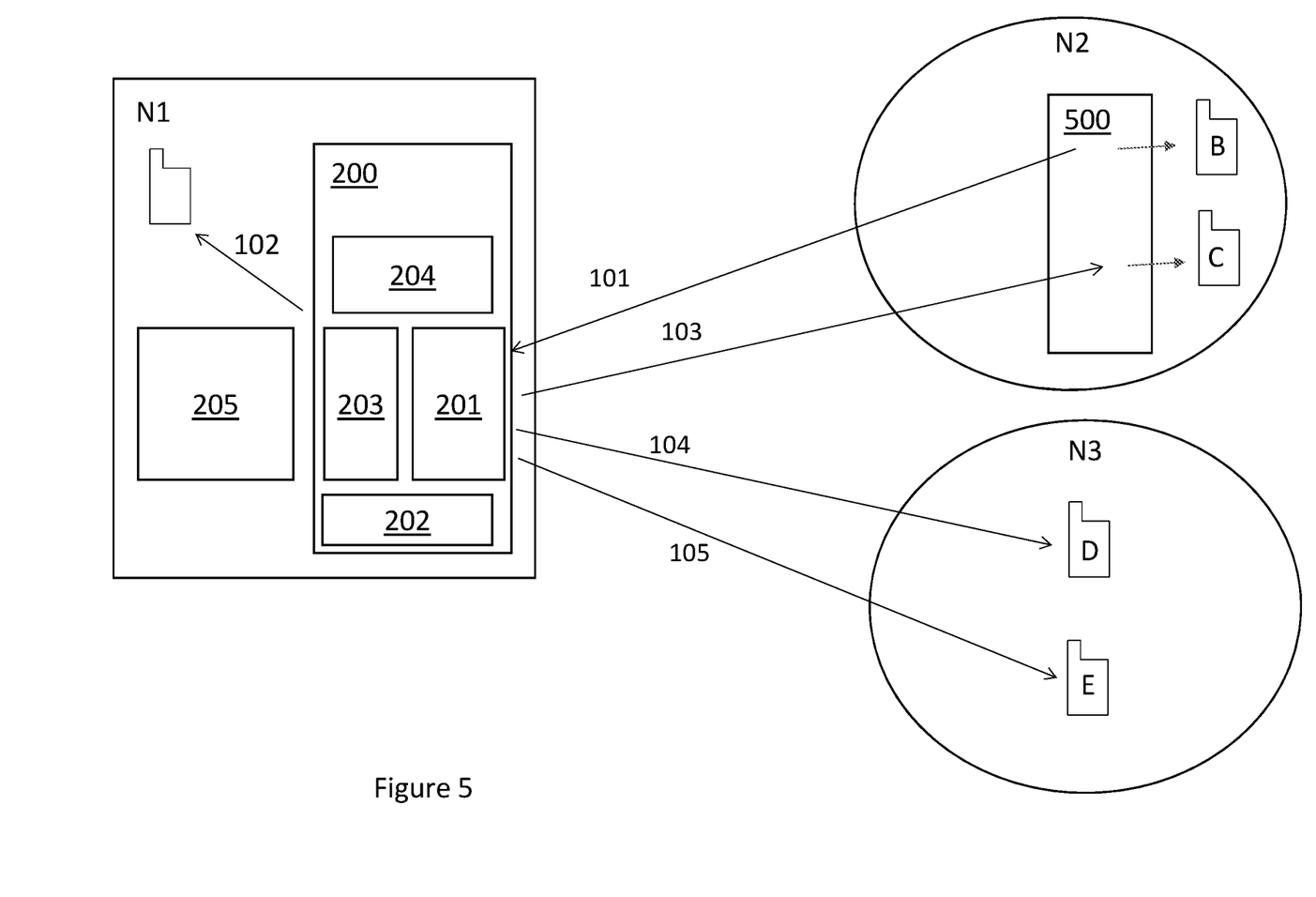
FIG. 5 shows a schematic diagram of a group messaging system.

FIG. 5 shows a schematic diagram comparable to that of FIG. 2, but in which network N2 is also provided with a group messaging server 500 capable of recording equivalent data about group chat messages to group messaging server 200 of network N1. Group messaging server 500 is configured to record data as described in relation to FIG. 2, which data can be utilised by network N2's charging system 501 in the same manner as described in relation to charging system 205. Such an arrangement, whereby each network records data in the same manner may further reduce the processing and data transmission requirements of group messaging charging. The common message ID utilised for related messages provides a common index for all networks to utilise when communicating charging data which further reduces the complexity of reconciling data from each of the networks.

The above description has described various components, functions, and processes of mobile networks and particularly group messaging servers. The terminology and division between those parts has been used purely for clarity of description and do not imply any actual technical division between those parts in an actual system. Similarly the functions and processes may be provided by any appropriate configuration and with any appropriate division as required for implementation in an actual network. Furthermore in an actual system there may be no formal distinction between these parts of the system with all parts being provided as one functional entity.

Where in this description components have been described as reading or obtaining data from another component, that function may be performed in any way. For example, the data may be requested using an API or via a direct access to a storage medium, or the data may be transmitted from the source component to the reading or obtaining component in response to a request or as part of a scheduled process.

The various systems and functions described herein may be implemented in a single computing system, or in multiple networked computing systems. The divisions between systems in this description need to be followed in an implementation, but have only been used for clarity of explanation. The actual implementation may be dependent on a range of parameters and requirements of the operator. In particular the data gathering system and analysis system may be provided as a single system, comprising a processing system to receive, process, and analyse the data and a data storage system (such as non-volatile computer memory) to store the data. The systems may be centrally located or may be distributed. As will be appreciated some functions are optional and may be omitted, while additional functions may also be provided, without moving outside the scope of this disclosure.

Functions relating to the processes described herein may be implemented on computers connected for data communication via the components of a packet data network. Although special purpose devices may be used, such devices also may be implemented using one or more hardware platforms intended to represent a general class of data processing device commonly used so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer that functions as the server or terminal device used for transmitting queries, analysing data, or responding to queries, or any other relevant function. In operation, the code is stored within the general-purpose computer platform. At other times, however, the software may be stored at other locations and/or transported for loading into the appropriate general-purpose computer system. Execution of such code by a processor of the computer platform or by a number of computer platforms enables the platform(s) to implement the methodologies described herein.

Those skilled in the art will be familiar with the structure of general purpose computer hardware platforms. As will be appreciated, such a platform may be arranged to provide a computer with user interface elements, as may be used to implement a personal computer or other type of work station or terminal device. A general purpose computer hardware platform may also be arranged to provide a network or host computer platform, as may typically be used to implement a server.

Figure 6:
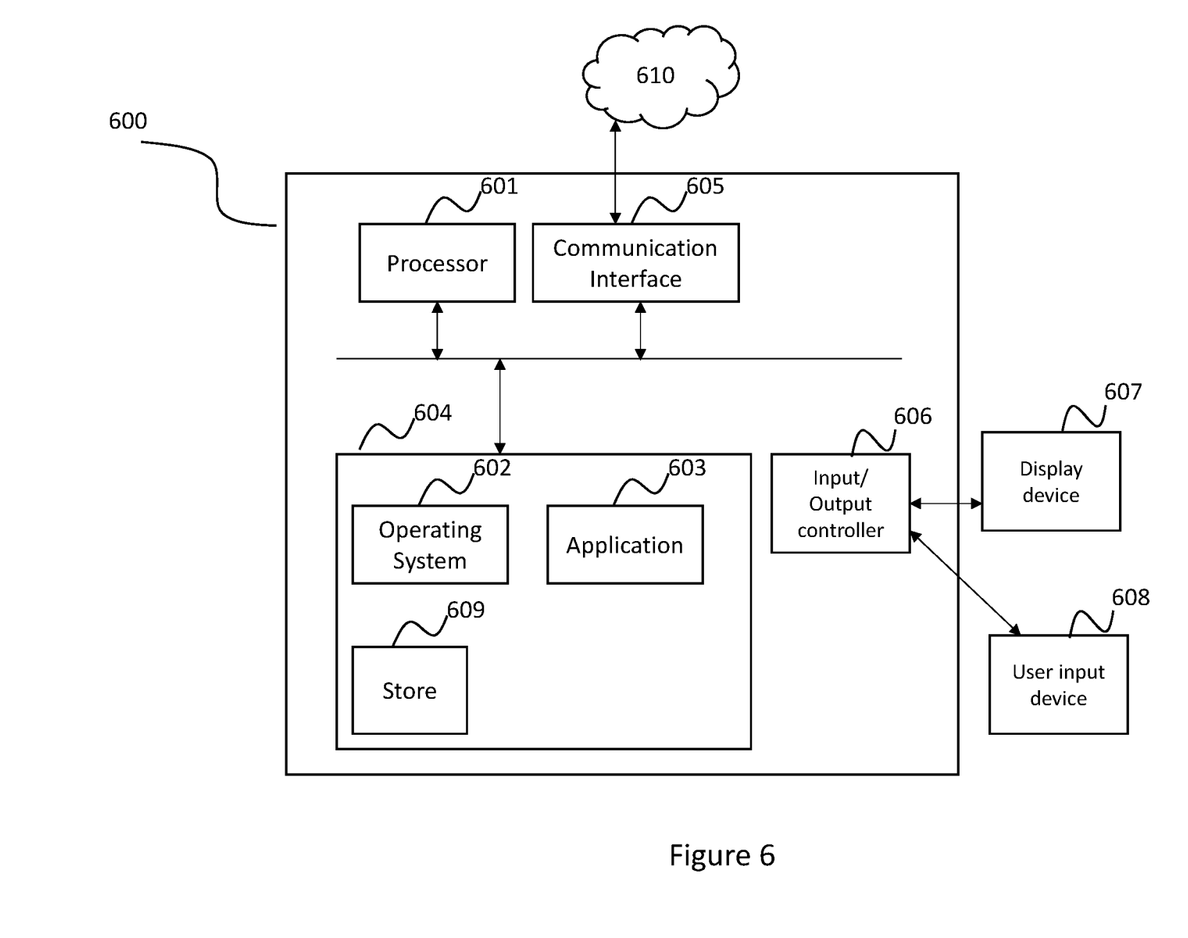
FIG. 6 shows a schematic diagram of an exemplary computing device.

FIG. 6 illustrates various components of an exemplary computing-based device 600 which may be implemented as any form of a computing and/or electronic device, and in which embodiments of any one or more of the systems described herein be implemented. For example, the systems 200-205 of FIG. 2 may be implemented using computing-based devices having some or all of the features shown in FIG. 6

Computing-based device 600 comprises one or more processors 601 which may be microprocessors, controllers or any other suitable type of processors for processing computer executable instructions to control the operation of the device in order to provide the functionality described hereinbefore. In some examples, for example where a system on a chip architecture is used, the processors 601 may include one or more fixed function blocks (also referred to as accelerators) which implement a part of the methods described hereinbefore in hardware (rather than software or firmware). Platform software comprising an operating system 602 or any other suitable platform software may be provided at the computing-based device to enable application software 603 to be executed on the device.

The computer executable instructions may be provided using any computer-readable media that is accessible by computing based device 600. Computer-readable media may include, for example, computer storage media such as memory 604 and communications media. Computer storage media, such as memory 604, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 604) is shown within the computing-based device 600 it will be appreciated that the storage may be distributed or located remotely and accessed via a network 610 or other communication link (e.g. using communication interface 605). Memory 604 may also provide a store system 609 for storing data for use by the computing system, for example in the form of databases. Communication interface 605 may also provide an interface to systems of the mobile telecommunications network to provide communications and functions required to perform the methods described herein.

The computing-based device 600 may also comprise an input/output controller 606 arranged to output display information to a display device 607 which may be separate from or integral to the computing-based device 600. The display information may provide a graphical user interface. The input/output controller 606 may also be arranged to receive and process input from one or more devices, such as a user input device 608 (e.g. a mouse or a keyboard). In an embodiment the display device 607 may also act as the user input device. The input/output controller 606 may also output data to devices other than the display device, e.g. a locally connected printing device (not shown in FIG. 6).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Aspects of the methods described herein may be embodied in programming. Program aspects of the technology may be thought of as "products" or "articles of manufacture" typically in the form of executable code and/or associated data that is carried on or embodied in a type of machine readable medium and/or in a plurality of such media. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fibre optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A data processing method performed in a group messaging server of a mobile telecommunications network, the method comprising the steps of:
   receiving an incoming message at the group messaging server from a remote user terminal, the message being for distribution to a group of users;
   storing details of the incoming message in a messaging log, the details comprising a message identifier received with the incoming message;
   identifying at least one recipient from the group of users to which the incoming message should be transmitted;
   transmitting an outgoing message to each of the at least one recipient, wherein the outgoing message comprises at least part of the incoming message and the message identifier;
   storing details of each outgoing message in the message log, the details comprising the message identifier; and
   processing the message log to identify groups of messages, wherein the groups of messages are identified by having a common message identifier, and generating charging data based on the groups of messages.

2. A method according to claim 1, wherein the group of users is identified by data stored in the group messaging server.

3. A method according to claim 1, wherein at least one of the group of users is a user of a different mobile telecommunications network to the mobile telecommunications network in which the group messaging server is located.

4. A method according to claim 1, wherein the charging data is dependent on the balance of incoming and outgoing messages between the mobile telecommunications network in which the group messaging server is located and another mobile telecommunications network.

5. A group messaging server in communication with a mobile telecommunications network, the group messaging server comprising a computer processor configured to execute instructions to perform the method according to claim 1.

* * * * *